(12) United States Patent
Baumann et al.

(10) Patent No.: US 8,986,850 B2
(45) Date of Patent: Mar. 24, 2015

(54) MULTI-LAYER BRAZING SHEET

(75) Inventors: Stephen F. Baumann, Lancaster, PA (US); Raymond J. Kilmer, Pittsburgh, PA (US); Baolute Ren, Lititz, PA (US)

(73) Assignee: Alcoa, Inc., Pittsburgh, PA (US)

( * ) Notice: Subject to any disclaimer, the term of this patent is extended or adjusted under 35 U.S.C. 154(b) by 199 days.

(21) Appl. No.: 13/422,586

(22) Filed: Mar. 16, 2012

(65) Prior Publication Data

US 2012/0237793 A1 Sep. 20, 2012

Related U.S. Application Data

(60) Provisional application No. 61/453,417, filed on Mar. 16, 2011.

(51) Int. Cl.
| | |
|---|---|
| *B32B 15/18* | (2006.01) |
| *F28F 19/06* | (2006.01) |
| *F28F 21/08* | (2006.01) |
| *B32B 15/01* | (2006.01) |
| *B23K 35/02* | (2006.01) |
| *B23K 35/28* | (2006.01) |
| *C22C 21/00* | (2006.01) |
| *C22C 21/02* | (2006.01) |
| *C22C 21/10* | (2006.01) |

(52) U.S. Cl.
CPC .............. *B32B 15/016* (2013.01); *F28F 19/06* (2013.01); *F28F 21/084* (2013.01); *F28F 21/089* (2013.01); *B23K 35/0238* (2013.01); *B23K 35/286* (2013.01); *B23K 35/288* (2013.01); *C22C 21/00* (2013.01); *C22C 21/02* (2013.01); *C22C 21/10* (2013.01); *Y10S 428/933* (2013.01); *Y10S 165/905* (2013.01)
USPC .......................... 428/654; 428/933; 165/905

(58) Field of Classification Search
None
See application file for complete search history.

(56) References Cited

U.S. PATENT DOCUMENTS

| | | | | | |
|---|---|---|---|---|---|
| 6,129,143 | A | * | 10/2000 | Hasegawa et al. | 165/133 |
| 6,627,330 | B1 | * | 9/2003 | Shimizu et al. | 428/654 |
| 7,255,932 | B1 | * | 8/2007 | Kilmer | 428/654 |
| 7,374,827 | B2 | * | 5/2008 | Kilmer | 428/654 |
| 2002/0142185 | A1 | | 10/2002 | Kilmer | |
| 2005/0064226 | A1 | * | 3/2005 | Benedictus et al. | 428/654 |
| 2005/0079376 | A1 | * | 4/2005 | Benedictus et al. | 428/654 |
| 2006/0003181 | A1 | | 1/2006 | Rajagopalan | |
| 2007/0122648 | A1 | * | 5/2007 | Vieregge et al. | 428/654 |
| 2007/0246509 | A1 | * | 10/2007 | Koshigoe et al. | 228/101 |
| 2008/0274367 | A1 | * | 11/2008 | Kilmer et al. | 428/607 |
| 2010/0147500 | A1 | * | 6/2010 | Minami et al. | 165/173 |
| 2010/0159272 | A1 | * | 6/2010 | Marois et al. | 428/652 |
| 2010/0304175 | A1 | * | 12/2010 | Kilmer et al. | 428/576 |

FOREIGN PATENT DOCUMENTS

| | | | |
|---|---|---|---|
| JP | 11-302759 | * | 11/1999 |
| JP | 2006-152380 | * | 6/2006 |
| WO | WO 03/089237 | | 10/2003 |

OTHER PUBLICATIONS

International Search Report mailed Jun. 8, 2012 in PCT/US2012/029451.

* cited by examiner

*Primary Examiner* — John J Zimmerman
(74) *Attorney, Agent, or Firm* — Greenberg Traurig, LLP (57) ABSTRACT

Various illustrative embodiments of a multi-layer brazing sheet are provided. The multi-layer brazing sheet demonstrates improved corrosion resistance on its exposed air side surface.

6 Claims, 4 Drawing Sheets

Representative corrosion attack after 50 days SWAAT exposure

Fig. 4A - assigned grade "A"

Fig. 4B - assigned grade "B"

Fig. 4C - assigned grade "C"

Fig. 4D - assigned grade "D"

FIG. 4

MULTI-LAYER BRAZING SHEET

RELATED APPLICATIONS

This application claims the benefit, and priority benefit, of U.S. Provisional Patent Application Ser. No. 61/453,417, filed Mar. 16, 2011, titled "Multi-Layer Brazing Sheet," the disclosure of which is incorporated herein in its entirety.

BACKGROUND

1. Field of Invention

This invention relates generally to brazeable multi-layer aluminum composites having desired compositions.

2. Description of the Related Art

Brazeable multi-layer aluminum composites can be utilized in heat exchanger systems. These composites should demonstrate high corrosion resistance in order to be effective in condenser tubing applications.

SUMMARY OF THE INVENTION

Various illustrative embodiments of a multi-layer brazing sheet are described herein. The multi-layer brazing sheet demonstrates good corrosion resistance on its exposed air side surface.

In certain illustrative embodiments, the brazing sheet can have at least three layers, including a core layer, an outer interliner layer and an outer braze liner layer. The outer interliner layer can be positioned on one side of said core layer. The outer braze liner layer can be positioned on the other side of said outer interliner layer from said core layer.

In certain other illustrative embodiments, the brazing sheet can have at least four layers, including a core layer, an outer interliner layer, an outer braze liner layer and an inner braze liner layer. The outer interliner layer can be positioned on one side of said core layer. The outer braze liner layer can be positioned on the other side of said outer interliner layer from said core layer. The inner braze liner layer can be positioned on the other side of said core layer from said outer interliner layer.

In certain other illustrative embodiments, the brazing sheet can have at least five layers, including a core layer, an outer interliner layer, an outer braze liner layer, an inner braze liner layer and an inner interliner layer. The outer interliner layer can be positioned on one side of said core layer. The inner interliner layer can be positioned on the other side of said core layer from said outer interliner layer. The outer braze liner layer can be positioned on the other side of said outer interliner layer from said core layer. The inner braze liner layer can be positioned on the other side of said inner interliner layer from said core layer.

In certain illustrative embodiments, a multi-layer aluminum alloy brazing sheet is provided. The brazing sheet can have a core layer comprising a 3XXX-series core alloy, an outer interliner layer comprising an aluminum alloy, and an outer braze liner layer comprising an aluminum alloy. At least one of the outer interliner layer and the outer braze liner layer can have a Zn content. Further, each of the outer interliner layer and the outer braze liner layer can have a Zn content. The aluminum alloy of the outer interliner layer can have a Zn content greater than or equal to 0.5%. The aluminum alloy of the outer interliner layer can have a Zn content from 0.5% to 5%. The aluminum alloy of the outer interliner layer can comprise up to 0.35% Fe, up to 0.6% Si and from 0.5% to 5% Zn. The aluminum alloy of the outer interliner can comprise about 0.1 to 1% Si, up to about 0.5% Fe, up to about 0.5% Cu, about 0.5 to 1.8% Mn, up to about 0.3% Cr, up to about 0.1% Mg and between about 0.5% and 5% Zn. The aluminum alloy of the outer braze liner layer can be a 4XXX-series alloy comprising between about 6% and 12% Si and up to 4% Zn. The aluminum alloy of the outer braze liner layer can be a 4XXX-series alloy comprising between about 6% and 12% Si and up to 3% Zn. The 3XXX-series alloy of the core layer can comprise up to 1.1% Si, from about 0.15% to 0.5% Fe, about 0.5% to 1.2% Cu, about 0.8% to 1.8% Mn, up to about 0.25% Mg, up to about 0.2% Ti and up to about 0.3% Cr. The 3XXX-series alloy of the core layer can comprise from 0.18% to 1.1% Si, from about 0.15% to 0.5% Fe, about 0.5% to 1.2% Cu, about 0.8% to 1.8% Mn, up to about 0.25% Mg, up to about 0.2% Ti and up to about 0.3% Cr. An inner braze liner layer can be positioned on the other side of the core layer from the outer interliner layer, said inner braze liner being a 4XXX-series aluminum alloy comprising from about 6% to 12% Si. An inner interliner layer can be positioned between the core and inner braze liner layer on the other side of the core layer from the outer interliner layer. The aluminum alloy inner interlayer can comprise about 0.1 to 1% Si, up to about 0.5% Fe, 0.1 to 1% Cu, about 0.5 to 1.8% Mn, up to about 0.05% Mg, up to about 0.2% Ti and up to about 0.3% Cr. The aluminum alloy inner interlayer can comprise about 0.1 to 1% Si, and up to about 0.5% Fe. The 3XXX-series alloy of the core layer can comprise up to 1.1% Si, from about 0.15% to 0.5% Fe, about 0.5% to 1.2% Cu, about 0.8% to 1.8% Mn, up to about 0.5% Mg up to about 0.2% Ti and up to about 0.3% Cr.

DETAILED DESCRIPTION

All component percentages herein are by weight percent unless otherwise indicated. As used herein, the term "substantially free" means that no purposeful additions of that alloying element were made to the composition, but that due to impurities and/or leaching from contact with manufacturing equipment, trace quantities of such elements may, nevertheless, find their way into the final alloy product.

When referring to any numerical range of values, such ranges are understood to include each and every number and/or fraction between the stated range minimum and maximum. For example, a range of about 0 to 3% Zn, or about 0 to about 3% Zn, would expressly include about 0%, about 3%, and all intermediate values of 0.1, 0.2, 0.3 and 1.0%, all the way up to and including 2.5, 2.8 and 2.9% Zn. The same applies to each other numerical property, relative thickness and/or elemental range set forth herein.

1xxx, 3xxx, 4xxx and 7xxx designations used herein refer to common alloy designations from the Aluminum Association (AA).

Various illustrative embodiments of a multi-layer brazing sheet 10 are described herein. Brazing sheet 10 can be used as a material in the fabrication of brazed heat exchanger equipment, including but not limited to folded multi-channel tube structures for use in stationary condensers for residential and commercial air conditioning units. Tubes formed of brazing sheet 10 can provide high corrosion resistance and extended service lifetime when compared to tubes formed from copper or other commercially available materials.

Figure 1:
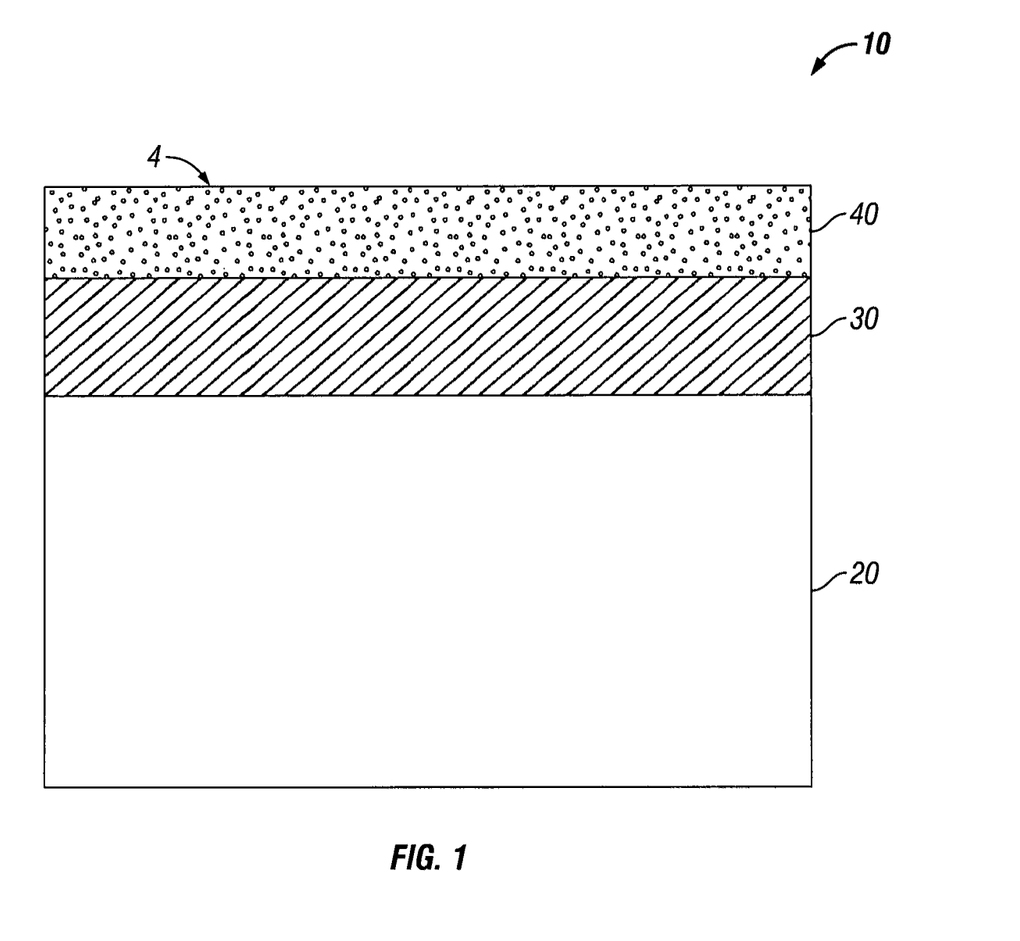
FIG. 1 is a schematic diagram of an aluminum alloy brazing sheet having at least three distinct layers in accordance with certain illustrative embodiments.

An illustrative embodiment of brazing sheet 10 is shown in FIG. 1. Sheet 10 includes three layers: a core layer 20, an outer interliner layer 30 and an outer braze liner layer 40. Outer interliner layer 30 is positioned on one side of said core layer 20. Outer braze liner layer 40 is positioned on the other side of said outer interliner layer 30 from said core layer 20. For a tube fabricated with sheet 10 of FIG. 1, core layer 20 would reside on the internal surface of the tube. The tube could be configured into a multi-channel tube by insertion of a turbulator type fin into the interior of the tube. For example, a clad turbulator could be used so that it would braze to core layer 20.

Figure 2:
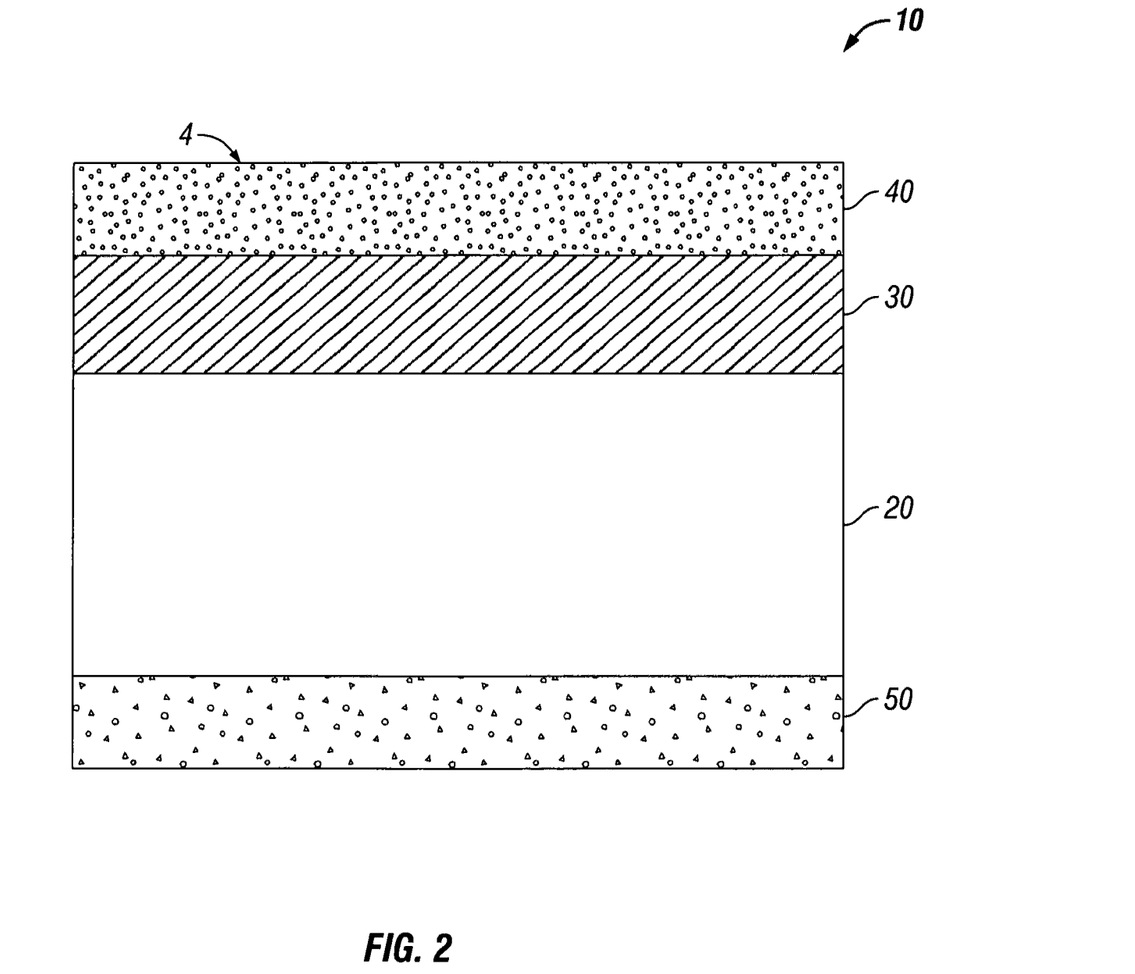
FIG. 2 is a schematic diagram of an aluminum alloy brazing sheet having at least four distinct layers in accordance with certain illustrative embodiments.

Another illustrative embodiment of brazing sheet 10 is shown in FIG. 2. Sheet 10 includes four layers: a core layer 20, an outer interliner layer 30, an outer braze liner layer 40 and an inner braze liner layer 50. Outer interliner layer 30 is positioned on one side of said core layer 20. Outer braze liner layer 40 is positioned on the other side of said outer interliner layer 30 from said core layer 20. Inner braze liner layer 50 is positioned on the other side of said core layer 20 from said outer interliner layer 30.

Figure 3:
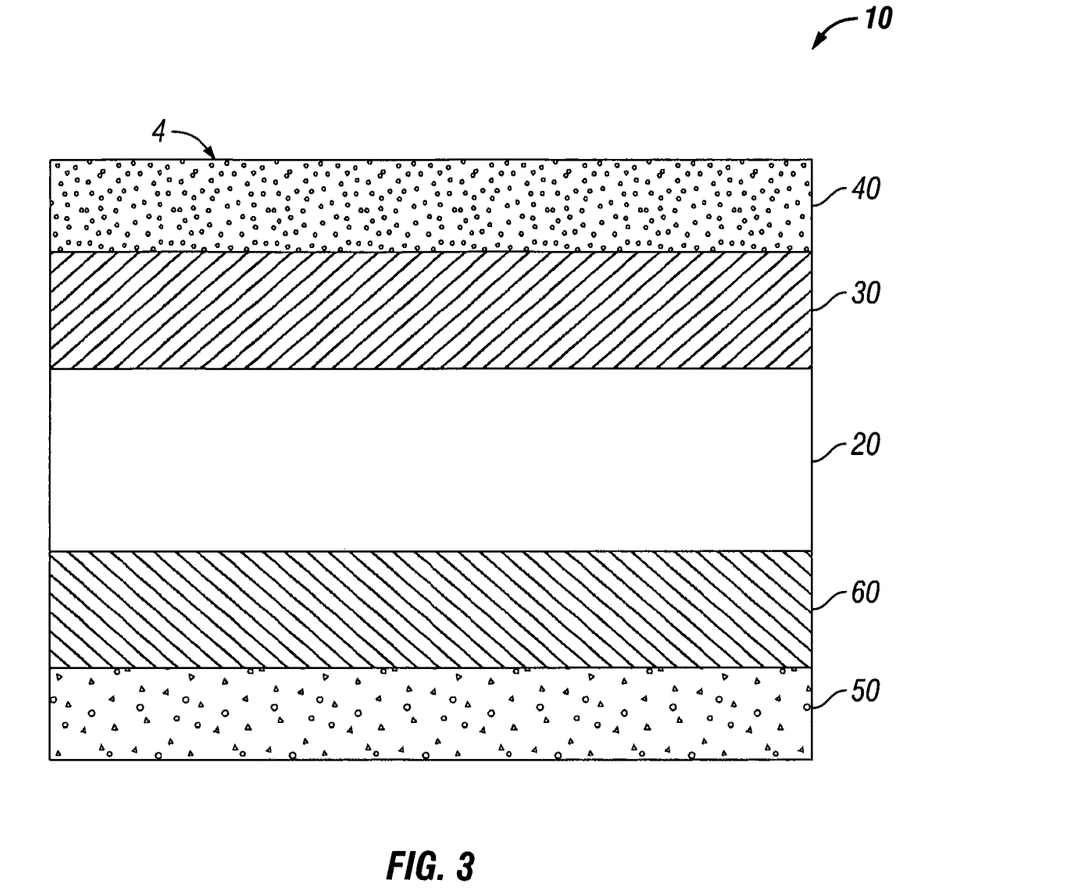
FIG. 3 is a schematic diagram of an aluminum alloy brazing sheet having at least five distinct layers in accordance with certain illustrative embodiments.
Figure 4A:
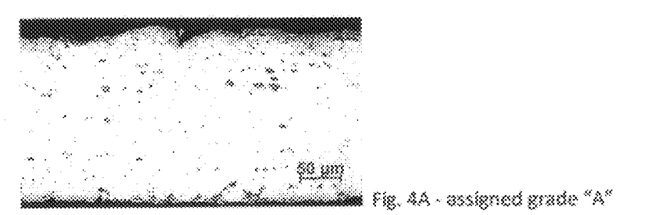
FIGS. 4A-4D illustrate representative corrosion attacks experienced by the various test materials after 50 days exposure in the SWAAT cabinet, along with letter grades associated with that level of attack in accordance with certain illustrative embodiments.
Figure 4B:
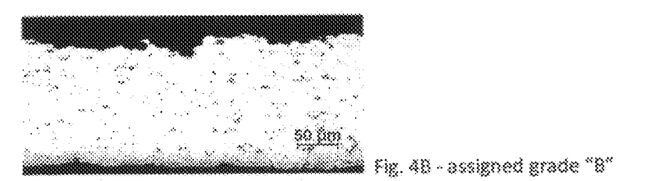
Figure 4C:
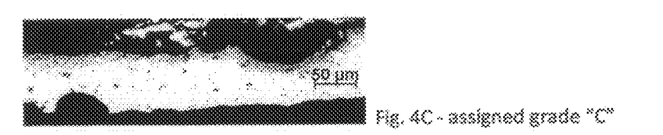
Figure 4D:
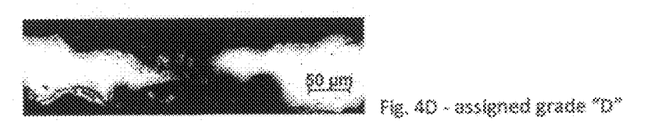

Another illustrative embodiment of brazing sheet 10 is shown in FIG. 3. Sheet 10 includes five layers: a core layer 20, an outer interliner layer 30, an outer braze liner layer 40, an inner braze liner layer 50 and an inner interliner layer 60. Outer interliner layer 30 is positioned on one side of said core layer 20. Inner interliner layer 60 is positioned on the other side of core layer 20 from outer interliner layer 30. Outer braze liner layer 40 is positioned on the other side of outer interliner layer 30 from core layer 20. Inner braze liner layer 50 is positioned on the other side of inner interliner layer 60 from core layer 20.

In various illustrative embodiments, outer braze liner layer 40 can be positioned on the air side of the formed tube, and inner braze liner layer 50 can be positioned on the refrigerant side of the formed tube. In the respective multi-layer embodiments of FIGS. 1-3, outer braze liner layer 40 can have an air side surface 4 located on the exterior surface of the formed tube.

In the foregoing descriptions of these multi-layer embodiments, the distinction between outer and inner layers generally refers to the position of the surfaces of sheet 10 with respect to the exterior profile of the final tube formed from sheet 10. Outer braze liner 40 and outer interliner layer 30 are on the side of sheet 10 that is meant to be exposed to the ambient environment of the heat exchanger like a condenser, while the core layer 20 or the inner braze liner layer 50 is meant to be positioned on the surface of sheet 10 that forms the inside of the exterior tube profile—thus for a condenser tube the inner surface of sheet 10 would be exposed to refrigerant during service. It is recognized that certain folded tube geometries will bring some of the outer tube surface into the inside of the tube, but the exterior surface of the tube should be exclusively constituted of the outer tubestock surface 4.

Sheet 10 is about 0.22 to 0.35 millimeters thick, in certain illustrative embodiments. Sheet 10 can be folded into a brazed assembly such as, for example, a tube for a condenser or other heat exchanger. The temper of sheet 10 can be H1X, H2X or O depending upon the customer needs for the tube forming process. The edges of sheet 10 are generally not sealed together during tube formation, in certain illustrative embodiments. Instead, when the tube is folded the edges of sheet 10 are on the interior of the tube, and a seam runs the length of the tube that is sealed during the brazing process. However, it is possible to seal the edges of the tube together during tube formation, such as by a high frequency induction or resistance welding process. In the case of a sealed tube, the tube generally will be flattened and then a turbulator would be inserted into the sealed tube. If the tubestock had an internal braze liner then the turbulator could be bare. If the tubestock did not have an internal braze liner the turbulator would be clad.

Corrosion through the full thickness of the formed tube could result in a leak of the refrigerant contained inside the tube and the rest of the refrigerant circuit, and therefore failure of the condenser or heat exchange unit. In certain illustrative embodiments, sheet 10 can have a post-braze structure that allows for the braze metal of the residual air side surface 4 and outer inter-liner layer 30, which constitute the exterior portion of the tube, to be anodic relative to core layer 20. Sheet 10 can be structured so that after brazing, the electrochemical potential gradient increases from near surface 4 towards the core layer 20 (that is, becomes less negative as measured by ASTM G69). Thus, the filler metal of residual air-side surface 4 and outer interliner layer 30 can provide cathodic protection to the underlying bulk of sheet 10. That is, if corrosion initiates on surface 4, as any pit tries to form it exposes more noble metal which should be protected by the metal closer to surface 4. This can delay the formation of pits and also the subsequent growth of pits.

The electrochemical potential of aluminum alloys can be largely controlled by the elements in solid solution. Elements like Zn, Sn, In, and Mg can make the potential more negative, while elements like Cu and Mn can make the potential less negative. Elements like Si can have more complex effects. While Si in solution shifts the potential in the direction of less negative, Si can combine with Mn and reduce the Mn in solution thus shifting the potential in the direction of more negative.

In the illustrative embodiments provided herein, core layer 20 can be formed of an aluminum alloy, such as a 3XXX series alloy. In all embodiments, core layer 20 can be more electrochemically noble than surface 4 of sheet 10 after brazing. The Zn content in core layer 20 prior to brazing should be minimized, for example to less than about 0.2%, due to its influence on corrosion potential. The Fe content in core layer 20 can also be minimized, for example to less than about 0.5% and in certain embodiments less than about 0.25%, because Fe generally does not reduce corrosion and only has a small positive impact on strength. Core layer 20 can include about 0.5 to 1.2% Cu. If core layer 20 contains less than about 0.5% Cu, the post-braze strength and shift in electrochemical potential can be limiting. If core layer 20 contains higher than about 1.2% Cu, the solidus (melting) temperature of the alloy can drop to unacceptable levels. Core layer 20 can include about 0.8 to 1.8% Mn. If core layer 20 contains less than about 0.8% Mn, the strength can be limited. If core layer 20 contains more than about 1.8% Mn, the potential for unacceptably large intermetallics to form during casting of the ingot can increase. If sheet 10 includes four layers, then core layer 20 can be Mg-free or substantially Mg-free, or can contain a moderate amount of Mg (less than about 0.25% or in certain embodiments less than about 0.1%) for strengthening and good CAB brazing performance at the internal joints of the tube. If sheet 10 includes five layers, then core layer 20 can contain a larger, but still moderate, amount of Mg (less than about 0.5%) and still have acceptable CAB brazeability. The core alloy can contain additions of Ti for corrosion resistance in amounts of up to about 0.20% Ti, or preferably in the range of about 0.1% to 0.17%. Optionally the core may also contain Cr up to about 0.3%. Good corrosion resistance can be realized with traditional long-life type cores (i.e., core layer 20 being a 3XXX-series alloy having less than about 0.18% Si) as well as non-long-life cores (i.e., core layer 20 having greater than about 0.18% Si). Si can be kept low (less than about 0.18%) to maintain Mn in solid solution in the core alloy and thus keep core layer 20 more noble. However, it is also possible to work with higher Si levels (up to about 1.1%) for increased post-braze strength. Higher Si levels can pull Mn out of solution, but as long as the other elements in the various layers of sheet 10 are properly controlled, core layer 20 can still be sufficiently noble relative to near-surface 4 of sheet 10 that corrosion protection is achieved.

In establishing the desired corrosion potential gradient from near air surface 4 of the tube to core layer 20, selection of the compositions of outer braze liner 40 and outer interliner 30 is important. Outer braze liner layer 40 can be formed of an aluminum alloy, for example a 4XXX series alloy. Outer braze liner layer 40 can be positioned nearest the air side of the tube. Zn can be incorporated into outer braze liner layer 40. Outer braze liner layer 40 can contain in the range of about 0 to 5% Zn. Outer braze liner layer 40 can also contain less than about 15% Si, or alternatively in the range of about 6 to 12% Si. In certain embodiments, outer braze liner layer 40 contains less than about 0.3% Cu, less than about 0.1% Mn, and less than about 0.05% Mg. Outer braze liner layer 40 can have a thickness in the range of about 15 to 40 microns, or in certain embodiments, in the range of about 20 to 30 microns.

Outer interliner layer 30 can be formed of an aluminum alloy, for example, a 1XXX series alloy, a 3XXX series alloy, or a 7XXX series alloy. Outer interliner layer 30 should be more electrochemically negative than core layer 20, so that outer interliner layer 30 can aid in protecting core layer 20.

In an illustrative embodiment outer interliner layer 30 can be formed from a "high purity" material that is alloyed with Zn. For example, outer interliner layer 30 can contain less than or equal to about 0.35% Fe, or alternatively less than or equal to about 0.25% Fe, and less than or equal to about 0.6% Si. Up to about 5% Zn can be added. There are no other intentional elemental additions, which means all other elements (Cu, Mn, Ni, etc. . . . ) in the outer interliner layer 30 are present at or below normal impurity levels. In another illustrative embodiment, which is aimed at increasing strength while maintaining corrosion resistance, outer interliner layer 30 utilizes a 3XXX series alloy with a Zn addition. In this embodiment, the Cu in outer interliner layer 30 is kept below about 0.5%. Mn can be added to outer interliner layer 30 in the range of about 0.5 to 1.8% for strengthening. If outer interliner layer 30 contains below about 0.5% Mn, the strengthening is limited. If outer interliner layer 30 contains above about 1.8% Mn, the additional incremental influence of Mn on strength is minimal and the potential for coarse intermetallics to form during solidification of the ingot is increased. Si can be added in the range of about 0.1 to 1.0% for strength and to remove Mn from solid solution. Zn can be added at a level of 0.5% or greater, and in certain embodiments, in the range of about 1.5% to 5%. Fe is limited to less than about 0.35% to minimize its effect on corrosion. In all of the aforementioned embodiments, outer interliner layer 30 should have an Mg content of less than about 0.1% to promote good CAB brazeability.

The desired thickness of outer interliner layer 30 can vary from application to application and with the compositions of core layer 20 and outer interliner layer 30 itself. In certain embodiments, the thickness of outer interliner layer 30 can be in the range of about 20 to 50 microns in the final sheet product.

Inner interliner layer 60 can be formed of an aluminum alloy, for example, a 1XXX series alloy or a 3XXX series alloy. In certain illustrative embodiments, inner interliner layer 60 provides a diffusion barrier that can limit the amount of Mg that travels from core layer 20 to the filler metal of inner braze liner layer 50 during brazing. The thickness of inner interliner layer 60 can vary depending upon, for example, the Mg content of core layer 20, the thickness of sheet 10, and the flux used. In certain embodiments, inner interliner layer 60 will have a thickness in the range of about 20 to 50 microns in the final sheet product. The composition of inner interliner layer 60 should be such that it does not negatively impact the corrosion potential profile through the thickness of sheet 10. The inner interliner layer 60 could be a high purity alloy containing less than or equal to about 0.5% Fe, or alternatively less than or equal to about 0.25% Fe, and less than or equal to about 0.6% Si. No other intentional elemental additions would be present in such a high purity inner interlayer. Alternatively, the inner interliner layer 60 could be a 3XXX-series alloy layer. In that case the inner interliner layer 60 can contain Mn for strengthening in the range of about 0.5 to 1.8%, Cu in the range of about 0.1 to 1.0%, Si in the range of about 0.1 to 1.0%, less than about 0.05% Mg and no more than about 0.5% Fe, or in certain embodiments less than about 0.25% Fe and up to about 0.2% Ti. To help establish the desired corrosion potential gradient through the thickness of the brazed tube the inner interliner should be substantially Zn-free, typically containing less than about 0.2 wt % Zn.

Inner braze liner layer 50 can be formed of an aluminum alloy, for example, a 4XXX series alloy. In certain embodiments, inner braze liner layer 50 can be any 4XXX series braze liner with less than about 15% Si. Alternatively, inner braze liner layer 50 can have in the range of about 6 to 12% Si. Inner braze liner layer 50 can be Zn-free or substantially Zn-free (less than about 0.2%). Inner braze liner layer 50 should contain less than about 0.3% Cu, no more than about 0.1% Mn, and no more than about 0.05% Mg. Inner braze liner layer 50 should be positioned on the refrigerant side of the tube, and have a thickness in the range of about 15 to 40 microns, and in certain embodiments, in the range of about 15 to 25 microns.

In the illustrative embodiments described herein, outer braze liner 40 and outer interliner layer 30 can each contain a relatively high amount of Zn, while inner interliner layer 60 and inner braze liner layer 50 are Zn-free or substantially Zn-free (less than about 0.2%). In certain illustrative embodiments, outer braze liner 40 can have higher amounts of Zn than that of core layer 20, outer interliner layer 30, inner braze liner 50 and inner interliner layer 60. In certain illustrative embodiments, outer interliner layer 30 can have higher amounts of Zn than that of outer braze liner 40, core layer 20, inner braze liner 50 and inner interliner layer 60.

In certain illustrative embodiments the outer braze liner layer 40 can be Zn-bearing, the outer interliner layer can be Zn-bearing or both the outer braze liner layer and the outer interliner layer can be Zn-bearing. During fabrication in the mill and during the brazing process Zn from the outer braze liner and/or outer interliner layer will diffuse in response to compositional gradients. As a result of this diffusion activity some Zn can be present in the core layer adjacent to the outer interlayer after brazing. However, the overall Zn-profile and other elemental profiles that are present through the thickness of the tube after brazing are such that the core layer 20 and inner interlayer 60 if present and residual inner filler metal 50 are cathodically protected by the near air surface structure of the tube.

Examples

Although various illustrative embodiments have been described generally above, the particular non-limiting examples provided below give additional illustration of the present subject matter.

A standard long-life tubestock alloy (Package 1) and 7 experimental packages (Packages 2-8) were fabricated to 0.26 mm H24 temper tubestock. For the 10% thickness target for the outer braze liner layer, there was an allowed margin of +/−2%. For the 15% thickness target for the outer interliner layer and inner interliner layer, there was an allowed margin of +/−3%. For the 7.5% thickness target for the inner braze liner layer, there was an allowed margin of +/−1.5%.

Packages 1-8 were evaluated for pre-braze and post-braze properties and SWAAT (Sea Water Acetic Acid Test, ASTM G85) resistance. The composite structures and alloys are described in Tables 1 & 2 below.

grade of "A" represents minimal attack, and a grade of "D" represents the most severe attack as illustrated in FIG. 4.

TABLE 3a

| Package | pre-braze tensile properties | | | post-braze tensile properties | | |
|---|---|---|---|---|---|---|
| | UTS (MPa) | YS (MPa) | el. (%) | UTS (MPa) | YS (MPa) | el. (%) |
| 1 | 223 | 197 | 9 | 149 | 61 | 18 |
| 2 | 213 | 192 | 10 | 151 | 59 | 17 |
| 3 | 185 | 164 | 11 | 142 | 66 | 18 |
| 4 | 185 | 163 | 10 | 147 | 59 | 18 |
| 5 | 204 | 173 | 9 | 146 | 57 | 15 |
| 6 | 204 | 185 | 11 | 156 | 56 | 17 |
| 7 | 173 | 144 | 12 | 153 | 61 | 16 |
| 8 | 174 | 144 | 12 | 160 | 59 | 17 |

TABLE 1

| Package | Outer braze liner layer | | Outer interliner layer | | Core Layer Alloy | Inner interliner layer | | Inner braze liner layer | |
|---|---|---|---|---|---|---|---|---|---|
| | Alloy | Thickness μm (%) | Alloy | Thickness μm (%) | | Alloy | Thickness μm (%) | Alloy | Thickness μm (%) |
| 1 (control) (composite 170) | 4343 | 26 (10%) | — | — | 0336 | — | — | 4343 | 19 (7.5%) |
| 2 (composite 171) | 4343 + 3Zn | 26 (10%) | — | — | core 2 | — | — | 4343 | 19 (7.5%) |
| 3 (composite 172) | 4343 + 3Zn | 26 (10%) | 0140 | 39 (15%) | core 1 | — | — | 4343 | 19 (7.5%) |
| 4 (composite 173) | 4343 + 3Zn | 26 (10%) | I/L 1 | 39 (15%) | core 1 | — | — | 4343 | 19 (7.5%) |
| 5 (composite 174) | 4343 + 3Zn | 26 (10%) | I/L 2 | 39 (15%) | core 1 | — | — | 4343 | 19 (7.5%) |
| 6 (composite 175) | 4343 + 3Zn | 26 (10%) | I/L 3 | 39 (15%) | core 2 | — | — | 4343 | 19 (7.5%) |
| 7 (composite 176) | 4343 | 26 (10%) | 0140 | 39 (15%) | core 3 | 0140 | 39 (15%) | 4343 | 19 (7.5%) |
| 8 (composite 177) | 4343 + 3Zn | 26 (10%) | 0140 | 39 (15%) | core 3 | 0140 | 39 (15%) | 4343 | 19 (7.5%) |

TABLE 2

| | Core 1 | Core 2 | Core 3 | I/L 1 | I/L 2 | I/L 3 | 0140 |
|---|---|---|---|---|---|---|---|
| Si | 0.12m | 0.9-1.0 | 0.08m | 0.36-0.44 | 0.65-0.75 | 0.3m | 0.34-0.50 |
| Fe | 0.25m | 0.2-0.3 | 0.2m | 0.25m | 0.25m | 0.2m | 0.20m |
| Cu | 0.8-0.9 | 0.5-0.6 | 1.05-1.2 | 0.05m | 0.05m | 0.05m | — |
| Mn | 1.1-1.3 | 1.4-1.5 | 1.15-1.25 | 0.05m | 0.95-1.05 | 1.1-1.2 | — |
| Mg | 0.05m | 0.05m | 0.25-0.35 | 0.05m | 0.05m | 0.05m | — |
| Zn | 0.05m | 0.05m | 0.05m | 1.9-2.1 | 1.9-2.1 | 2.8-3.2 | — |
| Ti | 0.12-0.16 | 0.10-0.15 | 0.12-0.16 | 0.05m | 0.05m | 0.05m | — |

"m"= maximum allowed value

Sheets of the various materials (Packages 1-8) were subjected to a braze cycle in a CAB furnace without flux or fins. After brazing, the refrigerant-side surfaces of the sheets were masked off with tape. In addition the edges of the air-side surface of the sheets were masked off with tape. The panels thus prepared were exposed in a SWAAT cabinet for 50 days. After 50 days, the sheets were removed from the SWAAT cabinet, cleaned in nitric acid and inspected. Areas of maximum attack were cross-sectioned for metallographic inspection.

Table 3a below reports the pre-braze and post-braze tensile properties for these various materials. Table 3b gives a comparative rating of the materials in terms of their SWAAT results. The extent of the attack was evaluated on the exposed air-side surface of the panel as well as under the tape on the edge of the exposed panel. The taped area represents an uncontrolled condition in the test, but is believed to represent corrosion that could occur in a crevice or in an otherwise "masked" surface that could create a local corrosion environment different than that away from the tape. In Table 3b, a TABLE 3b

| | Grade (For Exposed Surface) | Grade (For Region Under the Edge Tape) |
|---|---|---|
| Package 1 | B | D |
| Package 2 | B | D+ |
| Package 3 | B+ | B+ |
| Package 4 | B+ | B+ |
| Package 5 | A | A |
| Package 6 | B+ | B+ |
| Package 7 | B | C |
| Package 8 | B+ | C+ |

The standard long-life material (package 1) exhibited significant attack at the edges of the sheet under the tape. Package 2 which used a high Zn outer braze liner against a non-long-life core alloy also exhibited severe attack along at least one of the edges of the sample. Package 3 which used a high-Zn outer braze liner against a high purity outer interlayer in combination with a long-life core alloy exhibited good corrosion resistance even under the tape. Similarly, Package 4, which is similar to Package 3 but in which a Zn-bearing outer interliner is used, the corrosion resistance remains high. Package 5 substituted a 3XXX+Zn alloy for the outer interliner and delivered very good corrosion resistance. Package 6 exhibited very good corrosion resistance using a high-Zn outer braze liner with a high Zn outer interlayer in combination with a non-long-life core alloy. Composites 7 and 8 which used a very high strength (high Cu and Mg bearing) long-life core alloy in a 5-layer configuration exhibited notable attack at the edges of the sheet.

In general, all the materials showed good corrosion resistance on the exposed surface. The largest distinction among samples is noticed under the tape at the edge of the sample. In general, the four layer materials exhibited the best corrosion resistance under the edge of the tape. These results reflect the benefit of a high Zn content (>1%) in the outer braze liner layer 40 at the air-surface combined with the presence of outer interliner layer 30, which may also optionally contain Zn.

A second set of experimental materials were fabricated to further illustrate some of the material effects on corrosion. This time all the composites were fabricated to 0.30 mm H24-temper tubestock. Tables 4 & 5 describe these packages. Package 10-170 is the same as Package 1 from the first example and it was the 3-layer control. Package 10-174 is the same 4-layer composite as Package 5 from the first example set and was the material that performed best in that series. Package 11-033 is a 3-layer structure with a high-Zn outer braze liner with a long life core. Packages 11-034 and 11-035 use Zn-free braze liners with Zn-bearing 3XXX-series outer interliners with a long-life core. Package 11-036 is similar to 10-174 but uses a different long-life core alloy.

The table below reports pre- and post-braze tensile properties.

TABLE 6

| | H24 properties | | | post-braze | |
|---|---|---|---|---|---|
| Package | UTS (MPa) | YS (MPa) | el (%) | UTS (MPa) | YS (MPa) |
| 10-170 | 219 | 192 | 8.7 | 151 | 55.6 |
| 10-174 | 201 | 172 | 9.7 | 149 | 54.1 |
| 11-033 | 222 | 198 | 7.5 | 155 | 55.4 |
| 11-034 | 201 | 176 | 7.2 | 148 | 55.7 |
| 11-035 | 203 | 175 | 9.2 | 154 | 57.4 |
| 11-036 | 201 | 173 | 9.0 | 156 | 52.5 |

Corrosion ratings after 50 days exposure in SWAAT are tabulated below using the same relative ranking grade as for the prior example. The best overall corrosion resistance in this test is provided by having a Zn-bearing outer interliner. The use of a Zn-bearing outer braze liner is not found to be a requirement when the outer interlayer has Zn in certain illustrative embodiments. Good corrosion resistance is observed when a Zn-bearing outer braze liner is combined with a long-life core as in package 11-033, but still the 4-layer configurations with a Zn-bearing interliner performed better.

TABLE 7

| Package | Grade (exposed surface) | Grade (under tape) |
|---|---|---|
| 10-170 | B+ | C |
| 10-174 | A | A |
| 11-033 | B+ | B |
| 11-034 | A | A |
| 11-035 | A | A |
| 11-036 | A | A |

TABLE 4

| | outer braze liner | | outer inter liner | | | inner braze liner | |
|---|---|---|---|---|---|---|---|
| Package | alloy | microns (%) | alloy | microns (%) | core alloy | alloy | microns (%) |
| 10-170 | 4343 | 30 (10%) | | | 0336 | 4343 | 22.5 (7.5%) |
| 10-174 | 4343 + 3Zn | 30 (10%) | I/L2 | 45 (15%) | core 1 | 4343 | 22.5 (7.5%) |
| 11-033 | 4343 + 3Zn | 30 (10%) | | | core 1a | 4343 | 22.5 (7.5%) |
| 11-034 | 4343 | 30 (10%) | I/L2 | 45 (15%) | core 1a | 4343 | 22.5 (7.5%) |
| 11-035 | 4343 | 30 (10%) | I/L4 | 45 (15%) | core 1a | 4343 | 22.5 (7.5%) |
| 11-036 | 4343 + 3Zn | 30 (10%) | I/L2 | 45 (15%) | 0336 | 4343 | 22.5 (7.5%) |

TABLE 5

| | 0336 | Core 1 | Core 1a | I/L 2 | I/L 4 |
|---|---|---|---|---|---|
| Si | 0.25m | 0.12m | 0.18m | 0.65-0.75 | 0.75-0.85 |
| Fe | 0.40m | 0.25 | 0.40m | 0.25m | 0.25m |
| Cu | 0.5-0.6 | 0.8-0.9 | 0.75-0.9 | 0.05m | 0.05m |
| Mn | 1.0-1.3 | 1.1-1.3 | 1.0-1.3 | 0.95-1.05 | 1.0-1.3 |
| Mg | 0.05m | 0.05m | 0.05m | 0.05m | 0.05m |
| Zn | 0.10m | 0.05m | 0.05m | 1.9-2.1 | 3.8-4.2 |
| Ti | 0.10-0.20 | 0.12-0.16 | 0.10-0.20 | 0.05m | 0.05m |

Sheet 10 can be fabricated by a variety of commercial fabrication paths, such as traditional roll bonding. Alternatively, the entire composite or a portion of the composite can be cast as a multi-layer ingot via a multi-alloy casting process such as those described in U.S. Pat. No. 7,611,778 or U.S. Pat. No. 7,264,038 or U.S. Pat. No. 7,472,740.

It is to be understood that the subject matter herein is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

The invention claimed is:

1. A multi-layer aluminum alloy brazing sheet comprising:
a core layer comprising a 3XXX-series alloy;
an outer interliner layer comprising an aluminum alloy; and
an outer braze liner layer comprising an aluminum alloy wherein the outer interliner layer and the outer braze liner layer have a Zn content;
wherein the sheet has an electrochemical potential gradient increasing from near an outer surface towards the core layer;
wherein the 3XXX-series alloy of the core layer comprises less than or equal to 1.1% Si, from 0.15% to 0.5% Fe, 0.5% to 1.2% Cu, 0.8% to 1.8% Mn, up to 0.25% Mg, up to 0.2% Ti and up to 0.3% Cr;
wherein the aluminum alloy of the outer interliner layer comprises 0.1 to 1% Si, 0.15 to 0.5% Fe, up to 0.5% Cu, 0.5 to 1.8% Mn, up to 0.3% Cr, up to 0.1% Mg and between 0.5% and 5% Zn;
wherein the aluminum alloy of the outer braze liner layer is a 4XXX-series alloy comprising between 6% and 12% Si and between 2.0% and 5% Zn; and
further comprising an inner braze liner layer positioned on the other side of the core layer from the outer interliner layer, said inner braze liner being a 4XXX-series aluminum alloy comprising from 6% to 12% Si and being substantially Zn-free.

2. The brazing sheet of claim 1, wherein the 3XXX-series alloy of the core layer comprises less than 0.18% Si.

3. The brazing sheet of claim 1, wherein the 3XXX-series alloy of the core layer comprises 0.18 to 1.1% Si.

4. A multi-layer aluminum alloy brazing sheet comprising:
a core layer comprising a 3XXX-series alloy;
an outer interliner layer comprising an aluminum alloy; and
an outer braze liner layer comprising an aluminum alloy wherein the outer interliner layer and the outer braze liner layer have a Zn content;
wherein the sheet has an electrochemical potential gradient increasing from near an outer surface towards the core layer;
wherein the 3XXX-series alloy of the core layer comprises less than or equal to 1.1% Si, from 0.15% to 0.5% Fe, 0.5% to 1.2% Cu, 0.8% to 1.8% Mn, up to 0.25% Mg, up to 0.2% Ti and up to 0.3% Cr;
wherein the aluminum alloy of the outer interliner layer comprises 0.15 to 0.35% Fe, up to 0.6% Si and from 0.5% to 5% Zn;
wherein the aluminum alloy of the outer braze liner layer is a 4XXX-series alloy comprising between 6% and 12% Si and between 2.0% and 5% Zn; and
further comprising an inner braze liner layer positioned on the other side of the core layer from the outer interliner layer, said inner braze liner being a 4XXX-series aluminum alloy comprising from 6% to 12% Si and being substantially Zn-free.

5. The brazing sheet of claim 4, wherein the 3XXX-series alloy of the core layer comprises less than 0.18% Si.

6. The brazing sheet of claim 4, wherein the 3XXX-series alloy of the core layer comprises 0.18 to 1.1% Si.

* * * * *